US012217733B2

(12) United States Patent
Feng et al.

(10) Patent No.: US 12,217,733 B2
(45) Date of Patent: Feb. 4, 2025

(54) ROAD NOISE CANCELLATION SHAPING FILTERS

(71) Applicant: Harman International Industries, Incorporated, Stamford, CT (US)

(72) Inventors: Tao Feng, Novi, MI (US); Kevin J. Bastyr, Franklin, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 17/592,861

(22) Filed: Feb. 4, 2022

(65) Prior Publication Data

US 2023/0252967 A1 Aug. 10, 2023

(51) Int. Cl.
*G10K 11/178* (2006.01)

(52) U.S. Cl.
CPC .. *G10K 11/17823* (2018.01); *G10K 11/17817* (2018.01); *G10K 11/17837* (2018.01)

(58) Field of Classification Search
CPC ..... G10K 2210/3018; G10K 2210/128; G10K 2210/1282; G10K 2210/12821; G10K 2210/3028; G10K 11/17815; G10K 11/17823; G10K 11/17825; G10K 11/17881
See application file for complete search history.

(56) References Cited

U.S. PATENT DOCUMENTS 11,100,911 B1 8/2021 Jain
2005/0207585 A1* 9/2005 Christoph ........ G10K 11/17817 381/71.8
2018/0047383 A1* 2/2018 Hera .................... H04R 29/001
2019/0103087 A1* 4/2019 Valeri .................. G10K 11/002
2020/0204916 A1* 6/2020 Milani ............. G10K 11/17854
2020/0219478 A1* 7/2020 Zafeiropoulos ........ H04R 1/406

FOREIGN PATENT DOCUMENTS

| | | | | |
|---|---|---|---|---|
| DE | 19832517 A1 * | 1/2000 | ......... G10K 11/1784 |
| DE | 102014109678 A1 * | 1/2015 | ............... G01H 1/00 |
| EP | 3144928 B1 * | 3/2021 | ............ G01H 17/00 |
| JP | H07248784 A | 9/1995 | |
| WO | 2018097946 A1 | 5/2018 | |
| WO | 2021005145 A1 | 1/2021 | |

OTHER PUBLICATIONS

Extended European Search Report of European application No. 23154703.5 dated Jun. 6, 2023, 12 pages.

* cited by examiner

*Primary Examiner* — Kile O Blair
(74) *Attorney, Agent, or Firm* — BROOKS KUSHMAN P.C.

(57) ABSTRACT

A road noise cancellation (RNC) system is provided with at least one loudspeaker to project anti-noise sound within a passenger cabin of a vehicle in response to an anti-noise signal; and a controller. The controller is programmed to: determine a coherence value between a noise signal indicative of road induced noise and an error signal indicative of noise and the anti-noise sound within the passenger cabin; estimate a noise reduction value based on the coherence value; filter the noise signal and the error signal based on the estimated noise reduction value; and generate the anti-noise signal based on the filtered noise signal and the filtered error signal.

20 Claims, 6 Drawing Sheets

ROAD NOISE CANCELLATION SHAPING FILTERS

TECHNICAL FIELD

The present disclosure is directed to an active noise cancellation system and, more particularly, to an active noise cancellation system that automatically adjusts road noise cancellation shaping filters.

BACKGROUND

Active Noise Cancellation (ANC) systems attenuate undesired noise using feedforward and/or feedback structures to adaptively remove undesired noise within a listening environment, such as within a vehicle cabin. ANC systems generally cancel or reduce unwanted noise by generating cancellation sound waves to destructively interfere with the unwanted audible noise. Destructive interference results when noise and "anti-noise," which is largely identical in magnitude but opposite in phase to the noise, reduce the sound pressure level (SPL) at a location. In a vehicle cabin listening environment, potential sources of undesired noise come from the engine, the exhaust system, the interaction between the vehicle's tires and a road surface on which the vehicle is traveling, and/or sound radiated by the vibration of other parts of the vehicle. Therefore, unwanted noise varies with the speed, road conditions, and operating states of the vehicle.

A Road Noise Cancellation (RNC) system is a specific ANC system implemented on a vehicle in order to minimize undesirable road noise inside the vehicle cabin. RNC systems use vibration sensors to sense road induced vibration generated from the tire and road interface that leads to unwanted audible road noise. This unwanted road noise inside the cabin is then cancelled, or reduced in level, by using loudspeakers to generate sound waves that are ideally opposite in phase and identical in magnitude to the noise to be reduced at one or more listeners' ears. Cancelling such road noise results in a more pleasurable ride for vehicle passengers, and it enables vehicle manufacturers to use lightweight materials, thereby decreasing energy consumption and reducing emissions.

Vehicle-based ANC systems, such as RNC, are typically Least Mean Square (LMS) adaptive feed-forward systems that continuously adapt W-filters based on noise inputs (e.g., acceleration inputs from the vibration sensors) and signals of physical microphones located in various positions inside the vehicle's cabin. A feature of LMS-based feed-forward ANC systems and corresponding algorithms is the storage of the impulse response, or secondary path, between each physical microphone and each anti-noise loudspeaker in the system. The secondary path is the transfer function between an anti-noise generating loudspeaker and a physical microphone, essentially characterizing how an electrical anti-noise signal becomes sound that is radiated from the loudspeaker, travels through a vehicle cabin to a physical microphone, and becomes the microphone output signal.

The remote or virtual microphone technique is a technique in which an ANC system estimates an error signal generated by an imaginary or virtual microphone at a location where no real physical microphone is located, based on the error signals received from one or more real physical microphones. This virtual microphone technique can improve noise cancellation at a listener's ears even when no physical microphone is actually located there.

RNC systems are often adaptive LMS systems, so they update their W-filters to generate anti-noise from acceleration sensor signals in order to minimize the energy in the error microphone signals, thus making road noise quieter in the vehicle cabin. Said another way, due to the mathematics of the LMS technique, the energy of the microphone signals is minimized, and this sets the audible noise spectrum heard in the vehicle. In this way, the background (road) noise floor of the vehicle is essentially not tunable using existing technology, because the "frequency response" of the (road) noise floor is automatically set by the LMS system to minimize energy in the error microphone signals.

SUMMARY

In one embodiment, a road noise cancellation (RNC) system is provided with at least one loudspeaker to project anti-noise sound within a passenger cabin of a vehicle in response to an anti-noise signal; and a controller. The controller is programmed to: determine a coherence value between a noise signal indicative of road induced noise and an error signal indicative of noise and the anti-noise sound within the passenger cabin; estimate a noise reduction value based on the coherence value; filter the noise signal and the error signal based on the estimated noise reduction value; and generate the anti-noise signal based on the filtered noise signal and the filtered error signal.

In another embodiment, a method is provided for automatically adjusting a road noise cancellation (RNC) shaping filter. Anti-noise sound is projected within a passenger cabin of a vehicle in response to an anti-noise signal. A noise signal is received that is indicative of road induced noise within the passenger cabin. An error signal is received that is indicative of noise and the anti-noise sound within the passenger cabin. A coherence value between the noise signal and the error signal is determined. A noise reduction value is estimated based on the coherence value. The noise signal and the error signal are filtered based on the estimated noise reduction value. The anti-noise signal is generated based on the filtered noise signal and the filtered error signal.

In yet another embodiment, a road noise cancellation (RNC) system is provided with at least one loudspeaker to project anti-noise sound within a passenger cabin of a vehicle in response to an anti-noise signal; at least one microphone for providing an error signal indicative of the noise and the anti-noise sound within the passenger cabin; and a controller. The controller is programmed to: determine a coherence value between a noise signal indicative of road induced noise and an error signal indicative of noise and the anti-noise sound within the passenger cabin; estimate a noise reduction value based on the coherence value; filter at least one of the noise signal and the error signal based on the estimated noise reduction value; and generate the anti-noise signal based on the at least one of the filtered noise signal and the filtered error signal.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis.

Figure 1:
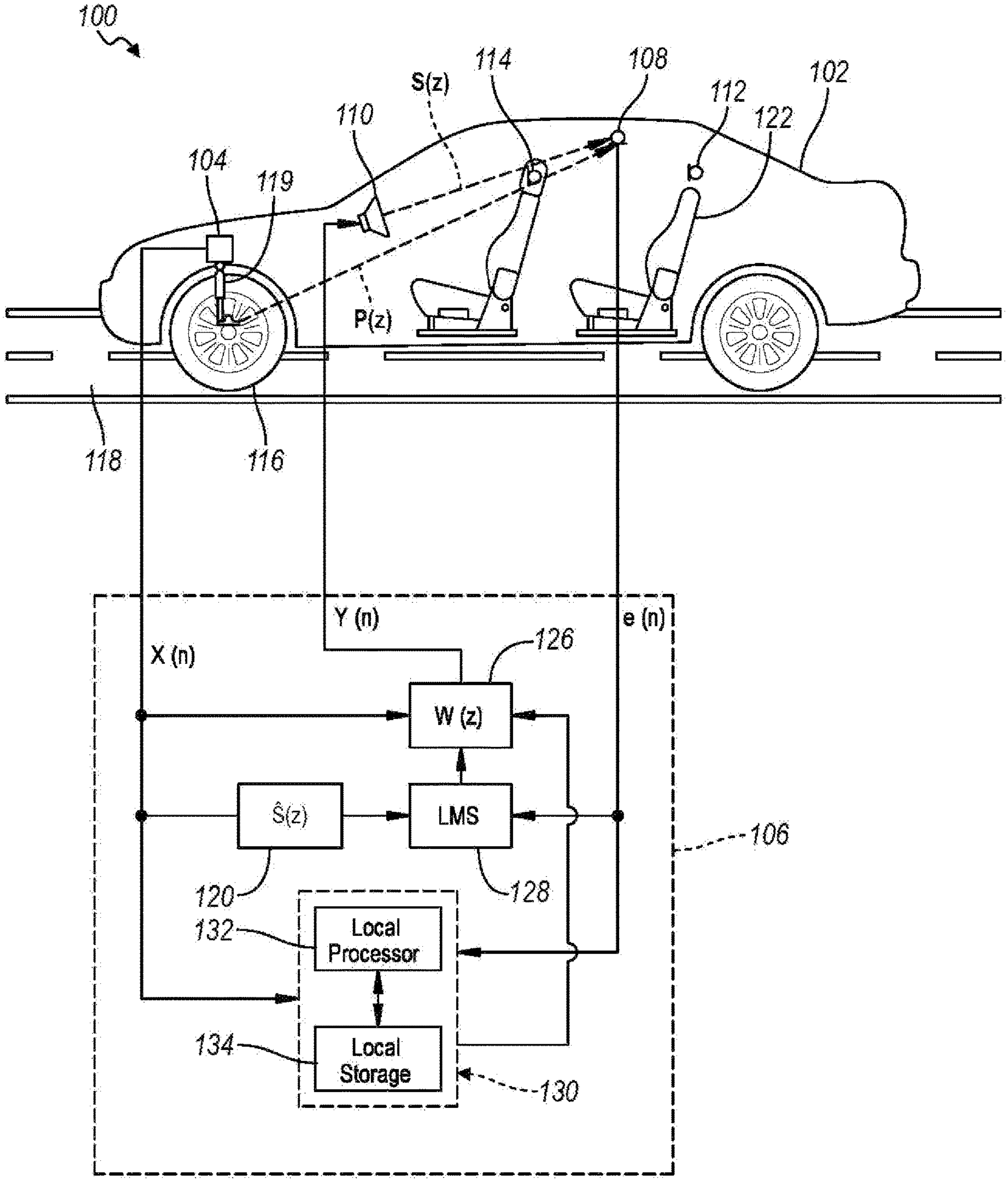
FIG. 1 is a schematic diagram of a vehicle having an active noise cancellation (ANC) system including a road noise cancellation (RNC) system, in accordance with one or more embodiments.

With reference to FIG. 1, a road noise cancellation (RNC) system is illustrated in accordance with one or more embodiments and generally represented by numeral 100. The RNC system 100 is depicted within a vehicle 102 having one or more vibration sensors 104. The vibration sensors 104 are disposed throughout the vehicle 102 to monitor the vibratory behavior of the vehicle's suspension, subframe, as well as other axle and chassis components. The RNC system 100 may be integrated with a broadband adaptive feed-forward active noise cancellation (ANC) system 106 that generates anti-noise by adaptively filtering the signals from the vibration sensors 104 using one or more physical microphones 108. The ANC system 106 evaluates the signals and automatically adjusts an RNC shaping filter. The anti-noise signal may then be played through one or more loudspeakers 110 to become sound. S(z) represents a transfer function between a single loudspeaker 110 and a single microphone 108.

While FIG. 1 shows a single vibration sensor 104, microphone 108, and loudspeaker 110 for simplicity purposes only, it should be noted that typical RNC systems use multiple vibration sensors 104 (e.g., ten or more), microphones 108 (e.g., four to six), and loudspeakers 110 (e.g., four to eight). The ANC system 106 may also include one or more virtual microphones 112, 114 that are used for adapting anti-noise signal(s) that are optimized for the occupants in the vehicle 102, according to one or more embodiments.

The vibration sensors 104 may include, but are not limited to, accelerometers, force gauges, geophones, linear variable differential transformers, strain gauges, and load cells. Accelerometers, for example, are devices whose output signal amplitude is proportional to acceleration. A wide variety of accelerometers are available for use in RNC systems. These include accelerometers that are sensitive to vibration in one, two and three typically orthogonal directions. These multi-axis accelerometers typically have a separate electrical output (or channel) for vibration sensed in their X-direction, Y-direction and Z-direction. Single-axis and multi-axis accelerometers, therefore, may be used as vibration sensors 104 to detect the magnitude and phase of acceleration and may also be used to sense orientation, motion, and vibration.

Noise and vibration that originates from a wheel 116 moving on a road surface 118 may be sensed by one or more of the vibration sensors 104 that are mechanically coupled to a suspension device 119 or a chassis component of the vehicle 102. The vibration sensor 104 may output a reference signal, or noise signal x(n) that represents the detected road-induced vibration. It should be noted that multiple vibration sensors are possible, and their signals may be used separately, or may be combined. In certain embodiments, a microphone may be used in place of a vibration sensor to output the noise signal x(n) indicative of noise generated from the interaction of the wheel 116 and the road surface 118. The noise signal x(n) may be filtered with a modeled transfer characteristic $\hat{S}(z)$, which estimates the secondary path (i.e., the transfer function between an anti-noise loudspeaker 110 and a physical microphone 108), by a secondary path filter 120.

Road noise that originates from the interaction of the wheel 116 and the road surface 118 is also transferred, mechanically and/or acoustically, into the passenger cabin and is received by the one or more microphones 108 inside the vehicle 102. The one or more microphones 108 may, for example, be located in a headliner of the vehicle 102, or in some other suitable location to sense the acoustic noise field heard by occupants inside the vehicle 102, such as an occupant sitting on a rear seat 122. The road noise originating from the interaction of the wheel 116 and the road surface 118 is transferred to the microphone 108 according to a transfer characteristic P(z), which represents the primary path (i.e., the transfer function between an actual noise source and a physical microphone).

The microphone 108 may output an error signal e(n) representing the sound present in the cabin of the vehicle 102 as detected by the microphone 108, including noise and anti-noise. In the RNC system 100, an adaptive transfer characteristic W(z) of a controllable filter 126 may be controlled by an adaptive filter controller 128, which may operate according to a least mean square (LMS) algorithm based on the error signal e(n) and the noise signal x(n) filtered with the modeled transfer characteristic $\hat{S}(z)$ by the secondary path filter 120. The controllable filter 126 is often referred to as a W-filter. An anti-noise signal Y(n) may be generated by the controllable filter or filters 126 and the noise signal, or a combination of noise signals x(n) and provided to the loudspeaker 110. The anti-noise signal Y(n) ideally has a waveform such that when played through the loudspeaker 110, anti-noise is generated near the occupants' ears and the microphone 108, that is substantially opposite in phase and identical in magnitude to that of the road noise audible to the occupants of the vehicle cabin. The anti-noise from the loudspeaker 110 may combine with road noise in the vehicle cabin near the microphone 108 resulting in a reduction of road noise-induced sound pressure levels (SPL) at this location. In certain embodiments, the RNC system 100 may receive sensor signals from other acoustic sensors in the passenger cabin, such as an acoustic energy sensor, an acoustic intensity sensor, or an acoustic particle velocity or acceleration sensor (not shown) to generate error signal e(n).

While the vehicle 102 is under operation, a controller 130 may collect and process the data from the vibration sensors 104 and the microphones 108. The controller 130 includes a processor 132 and storage 134. The processor 132 collects and processes the data to construct a database or map containing data and/or parameters to be used by the vehicle 102. The data collected may be stored locally in the storage 134, or in the cloud, for future use by the vehicle 102. Examples of the types of data related to the RNC system 100 that may be useful to store locally at storage 134 include, but are not limited to, accelerometer or microphone spectra or time dependent signals, other acceleration characteristics including spectral and time dependent properties, such as coherence or the estimated maximum noise cancellation data. Predetermined or online computed peak, shelf or other shaping filters can also be stored.

Although the controller 130 is shown as a single controller, it may contain multiple controllers, or it may be embodied as software code within one or more other controllers, such as the adaptive filter controller 128. The controller 130 generally includes any number of microprocessors, ASICs, ICs, memory (e.g., FLASH, ROM, RAM, EPROM and/or EEPROM) and software code to co-act with one another to perform a series of operations. Such hardware and/or software may be grouped together in modules to perform certain functions. Any one or more of the controllers or devices described herein include computer executable instructions that may be compiled or interpreted from computer programs created using a variety of programming languages and/or technologies. In general, a processor, e.g., the processor 132 receives instructions, for example from a memory, e.g., storage 134, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. The controller 130 also includes predetermined data, or "look up tables" that are stored within the memory, according to one or more embodiments.

As previously described, typical RNC systems may use several vibration sensors, microphones and speakers to sense structure-borne vibratory behavior of a vehicle and generate anti-noise. The vibration sensors may be multi-axis accelerometers having multiple output channels. For instance, triaxial accelerometers typically have a separate electrical output for vibrations sensed in their X-direction, Y-direction, and Z-direction. A typical configuration for an RNC system may have, for example, six error microphones, six speakers, and twelve channels of acceleration signals coming from four triaxial accelerometers or six dual-axis accelerometers. Therefore, the RNC system will also include multiple S'(z) filters (e.g., secondary path filters 120) and multiple W(z) filters (e.g., controllable filters 126).

The simplified RNC system schematic depicted in FIG. 1 shows one secondary path, represented by S(z), between the loudspeaker 110 and the microphone 108. As previously mentioned, RNC systems typically have multiple loudspeakers, microphones and vibration sensors. Accordingly, a six-speaker, six-microphone RNC system will have thirty-six total secondary paths (i.e., 6×6). Correspondingly, the six-speaker, six-microphone RNC system may likewise have thirty-six $\hat{S}(z)$ filters (i.e., secondary path filters 120), which estimate the transfer function for each secondary path. As shown in FIG. 1, an RNC system will also have one W(z) filter (i.e., controllable filter 126) between each noise signal x(n) from a vibration sensor (e.g., an accelerometer) 104 and each loudspeaker 110. Accordingly, a twelve-accelerometer noise signal, six-speaker RNC system may have seventy-two W(z) filters. The relationship between the number of noise signals, loudspeakers, and W(z) filters is illustrated in FIG. 2.

Figure 2:
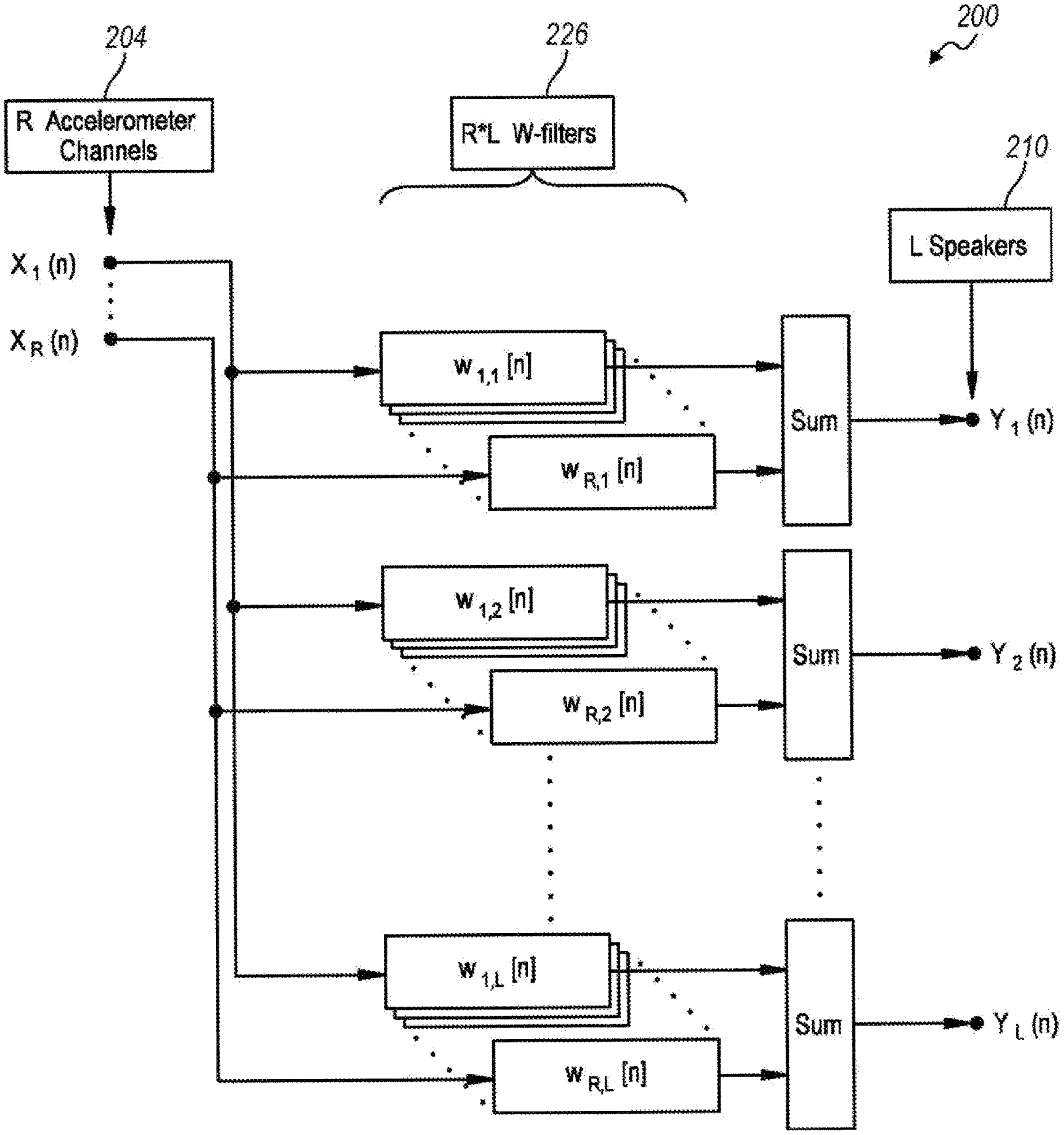
FIG. 2 is a sample schematic diagram demonstrating relevant portions of an RNC system scaled to include R accelerometer noise signals and L loudspeaker signals.

FIG. 2 is a sample schematic diagram demonstrating relevant portions of an RNC system 200 scaled to include R noise signals $[X_1(n), X_2(n), \ldots X_R(n)]$ from accelerometers 204 and L loudspeaker signals $[Y_1(n), Y_2(n), \ldots Y_L(n)]$ from loudspeakers 210. Accordingly, the RNC system 200 may include R*L controllable filters (or W-filters) 226 between each of the noise signals and each of the loudspeakers. As an example, an RNC system having twelve accelerometer outputs (i.e., R=12) may employ six dual-axis accelerometers or four triaxial accelerometers. In the same example, a vehicle having six loudspeakers (i.e., L=6) for reproducing anti-noise, therefore, may use seventy-two W-filters in total. At each of the L loudspeakers, R W-filter outputs are summed to produce the loudspeaker's anti-noise signal Y(n). Each of the L loudspeakers may include an amplifier (not shown). In one or more embodiments, the R noise signals filtered by the R W-filters are summed to create an electrical anti-noise signal y(n), which is fed to the amplifier to generate an amplified anti-noise signal Y(n) that is sent to a loudspeaker.

Figure 3:
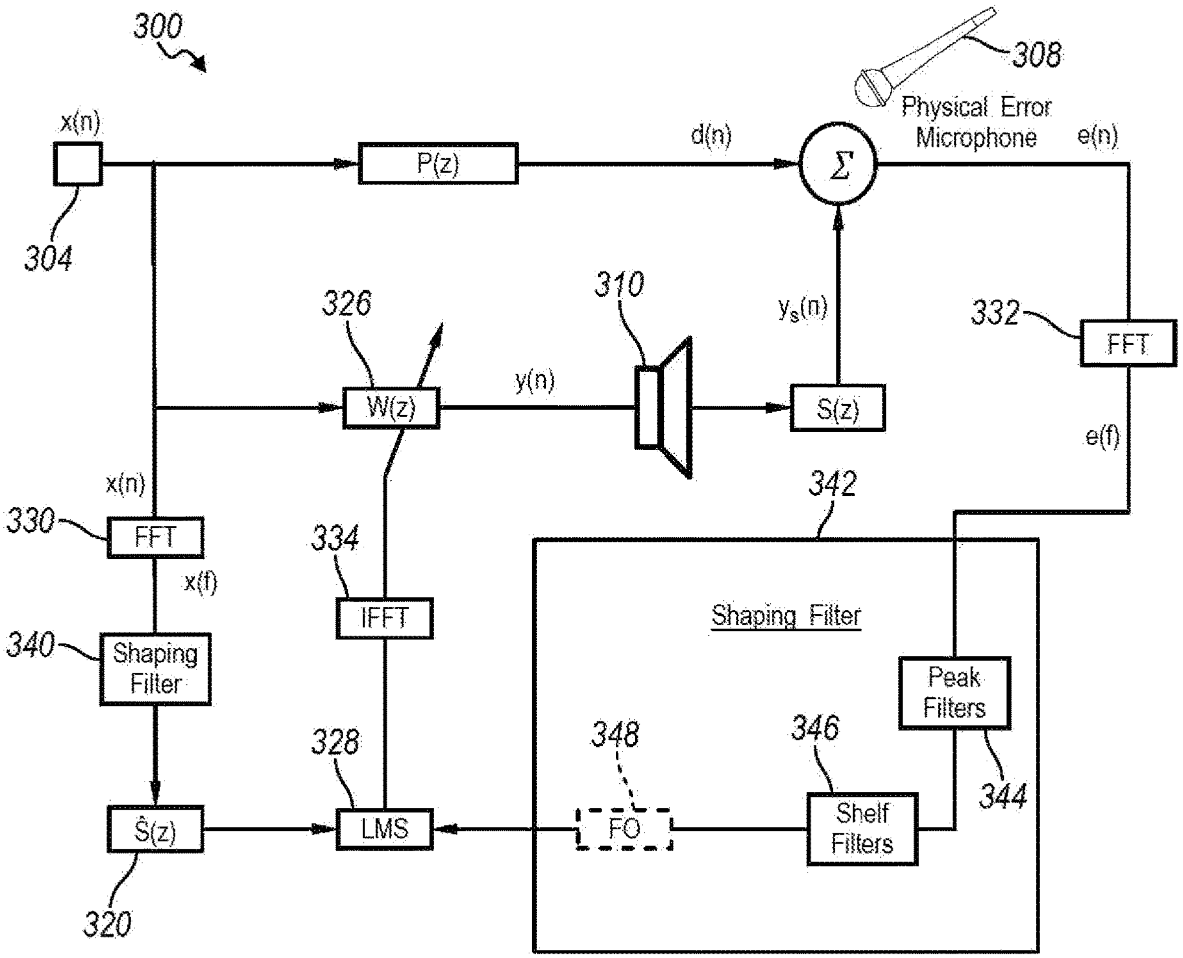
FIG. 3 is a sample schematic block diagram of an RNC system including shaping filters, in accordance with one or more embodiments.

FIG. 3 is a schematic block diagram illustrating an example of an RNC system 300. Similar to the RNC system 100 of FIG. 1, the RNC system 300 may include a vibration sensor 304, a physical error microphone 308, a loudspeaker 310, a secondary path filter 320, a W- filter 326, and an adaptive filter controller 328 consistent with operation of the vibration sensor 104, the physical microphone 108, the loudspeaker 110, the secondary path filter 120, the controllable filter 126, and the adaptive filter controller 128, respectively, as described with reference to FIG. 1. FIG. 3 also shows a primary path P(z) and a secondary path S(z). The adaptive filter controller 328 includes an integrated processor and storage, according to one or more embodiments. In other embodiments, the RNC system 300 includes separate processor and storage like the RNC system 100 of FIG. 1.

The RNC system 300 includes a first fast Fourier transform (FFT) block 330 for converting the noise signal x(n) to the frequency domain x(f), and a second FFT block 332 for converting the error signal e(n) to the frequency domain e(f). The RNC system 300 also includes an inverse FFT (IFFT) block 334 for converting the W-filter that was adapted in the frequency domain by the adaptive filter controller 328 into time domain W-filter 326.

The RNC system 300 also includes shaping filters for "tuning" or prioritizing the amount of noise cancellation in certain frequency ranges. The RNC system 300 includes a first shaping filter 340 for tuning or shaping the noise signal x(f) and a second shaping filter 342 for tuning the error signal e(f). As shown with reference to the second shaping filter 342, which is representative of the first shaping filter 340, each shaping filter may include a combination of peak filters 344 and shelf filters 346. A peak filter increases the magnitude of a narrow band of frequencies while not amplifying other frequencies. A shelf or shelving filter boosts or attenuates an end of a frequency spectrum. In one or more embodiments, the shelf filter 346 is a high shelf that attenuates or boosts the high end of the frequency spectrum. In one or more embodiments, the shaping filter 342 includes zero to five peak filters 344, and zero to two shelf filters 346. The shaping filter 342 may also include one or more additional filters, such as band pass, band stop, high pass, and low pass filters (not shown). In one or more embodiments, each shaping filter 340, 342 may also include a filter optimization (FO) block 348 to automatically design the RNC shaping filter (shown in FIG. 4) after deactivating or bypassing the peak filters 344 and the shelf filter 346. The FO block 348 automatically designs the RNC shaping filter by adjusting or tuning filter parameters or shape. The FO block 348 uses artificial intelligence optimization, according to one or more embodiments. Although the shaping filters 340 and 342 are shown in the frequency domain after the FFT blocks 330 and 332; the shaping filters 340 and 342 may be implemented in the time domain in other embodiments.

Figure 4:
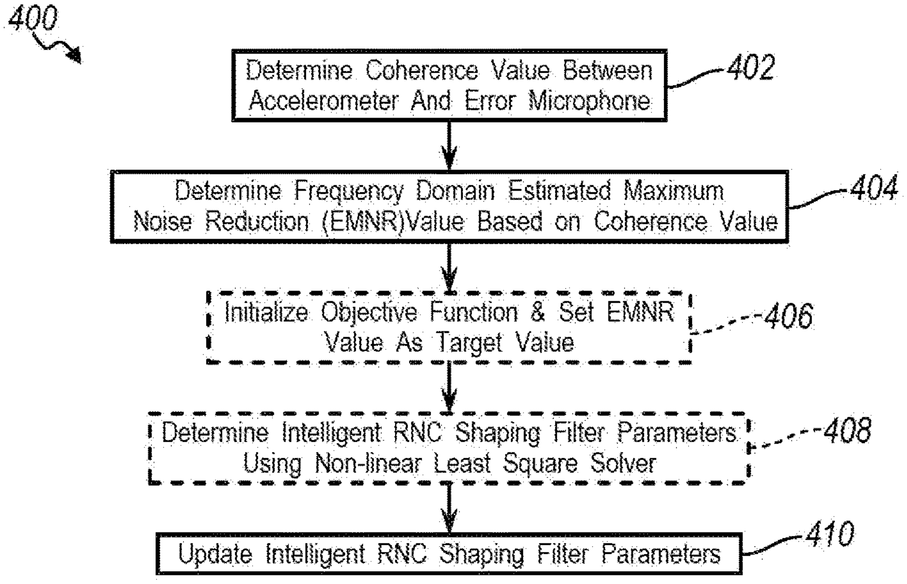
FIG. 4 is a flowchart depicting a method for automatically adjusting RNC shaping filters.

FIG. 4 is a flowchart depicting a method 400 for automatically adjusting an RNC shaping filter, in accordance with one or more embodiments of the present disclosure. Various steps of the disclosed method may be carried out by the adaptive filter controller 128, 328 either alone, or in combination with other components of the RNC system 100, 300, e.g., the processor 132 and the storage 134 or other processor connected wirelessly or by wires to the RNC system 100, 300. While the flowchart is illustrated with a number of sequential steps, one or more steps may be omitted and/or executed in another manner without deviating from the scope and contemplation of the present disclosure.

At step 402, the RNC system 300 determines a coherence value $C_{xe}(f)$ between the reference signal x(f) and the error microphone signal e(f). A coherence value refers to a statistical quantity that can be used to quantify the relation between two signals. Coherence ($C_{xe}(f)$) has a value between zero and one, (i.e., $0 \le C_{xe}(f) \le 1$) and is calculated using the frequency dependent cross spectrum of the reference signal x(n) and the error microphone signal e(n); the frequency dependent auto-spectrum of the error microphone signal e(n) and the auto-spectrum of the reference signal x(n), as shown in Equation (1):

$$C_{xe}(f) = \frac{|S_{xe}(f)|^2}{S_{xx}(f)S_{ee}(f)} \tag{1}$$

Where $S_{xe}(f)$ is the cross spectrum of the reference signal x(n) and the error microphone e(n), $S_{xx}(f)$ and $S_{ee}(f)$ are the auto-spectrum spectra of the reference signal x(n) and error microphone e(n) respectively, and f is the related frequency bin. Coherence is described in terms of a single reference signal and a single error microphone signal in Equation (1).

Coherence may also be expressed in terms of multiple coherence among multiple accelerometer and error microphone signals, as shown in Equation (2):

$$C_{xe_i} = \Sigma_{j=1}^{J} C_{x_j e_i}(f) \tag{2}$$

where (j) is the number of reference signals, j=1,2, . . . , J, and (i) is the related error microphone signal. Generally, the higher the coherence $C_{xe}(f)$ is, the more noise reduction can be achieved.

At step 404, the RNC system 300 determines a frequency dependent Estimated Maximum Noise Reduction (EMNR) value based on the coherence value $C_{xe}$ (f), as shown in Equation (3):

$$\mathrm{EMNR}(f) = -10\log(1 - C_{xe}(f)) \tag{3}$$

Figure 5:
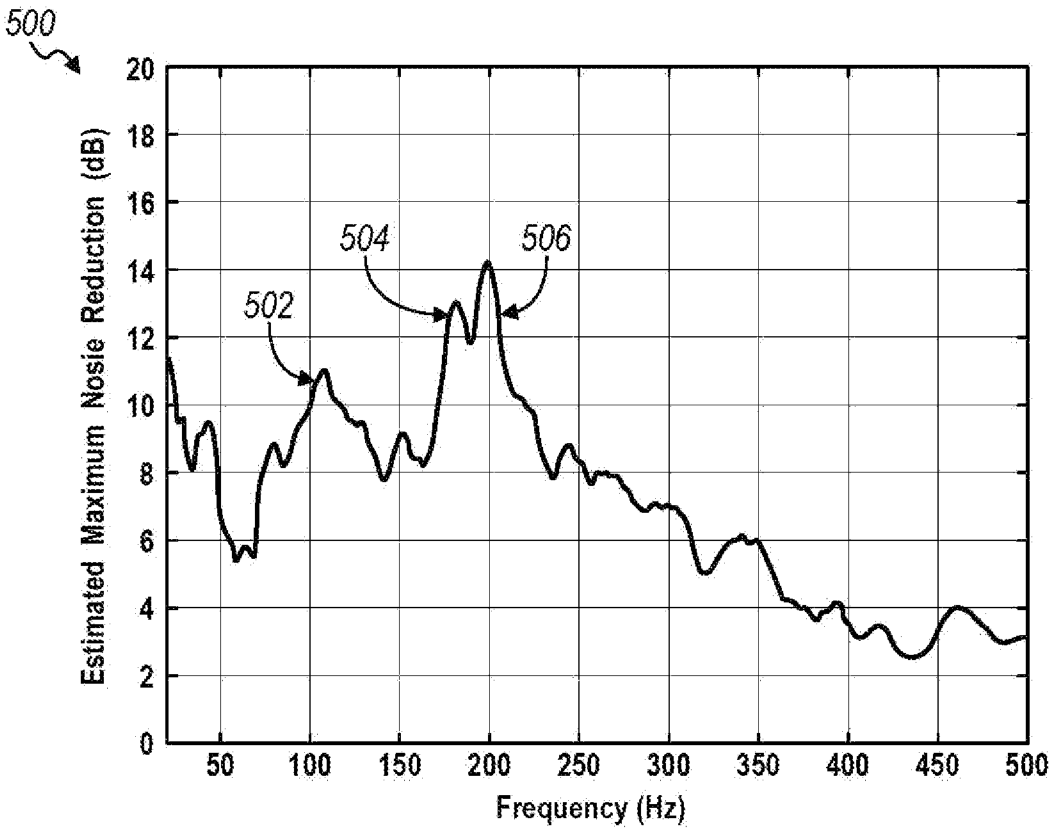
FIG. 5 is a graph illustrating an Estimated Maximum Noise Reduction (EMNR) value.

FIG. 5 is a graph 500 illustrating an example EMNR spectrum calculated using Equation (3). The EMNR value is the frequency-dependent, maximum theoretical noise cancellation that is possible using a given set of reference and error signals. The RNC system 300 calculates the EMNR using only the coherence between the accelerometer and error sensors. In practice, the actual noise cancellation realized in the RNC system 300 will be less than the EMNR due to the latency inherent in real noise cancellation systems, or due to limitations in the low frequency output of real speakers that create anti-noise. However, the EMNR can be used to create the RNC shaping filter for the RNC algorithm, as it shows the frequencies at which the RNC system has the theoretical ability to cancel well. For example, the graph 500 illustrates peak EMNR values, which indicate high values of potential noise cancellation, at 110 Hz, 180 Hz and 200 Hz, which are referenced by numerals 502, 504, and 506, respectively.

Referring back to FIG. 4, the method 400 provides an intelligent RNC shaping filter design technique including a smoothing technique using Artificial Intelligence Optimization (AIO), according to one or more embodiments. In one or more embodiments, the RNC system 300 may use one or multiple different "smoothing techniques," such as a moving average, curve fitting approaches such as least squares, a nonlinear least square solver, or simply a Savizky-Golay filter. In other embodiments, the RNC system 300 does not include a smoothing technique. In certain embodiments, it may be advantageous to implement the RNC shaping filter in the frequency domain, and in others it may be advantageous to implement in the time domain. The method 400 is the process of automatically generating and tuning the parameters of the intelligent RNC shaping filter; and updating the intelligent RNC shaping filter in the RNC system 300. Using the method 400, the RNC system 300 tunes the parameters of the intelligent RNC shaping filter to satisfy the requirement of the desired shaping filter, while improving performance.

At step 406, the RNC system 300 initializes the objective function, which is based on Mean Square Error (MSE), and sets the EMNR value as a target value. To determine the best parameters or shape of the intelligent RNC shaping filter, the RNC system 300 calculates the Mean Square Error (MSE) between the EMNR value at step 404, and determines the frequency response of the generated intelligent RNC shaping filter in each iteration at step 406, which determines AIO gradient direction.

At step 408, the RNC system 300 determines the intelligent RNC shaping filter parameters based on the AIO gradient direction using a non-linear least square solver. The non-linear square is a method to calculate the non-linear curve function or parameters of the desired filter based on the definition of the objective function, which is shown in Equation (4):

$$\min_x \|F(f, xdata) - ydata\|_2^2 = \min_x \sum_i (F(f, xdata_i) - ydata_i)^2 \tag{4}$$

Where F( )is the objective function for the RNC shaping algorithm; (ydata) is the EMNR value on all target frequency bins f; (xdata) is the initial value of the intelligent RNC shaping filter on all target frequency bins f; (x) is the set of intelligent RNC shaping filter's parameters to be optimized; and (i) is the number of iterations for AIO calculation.

Figure 6:
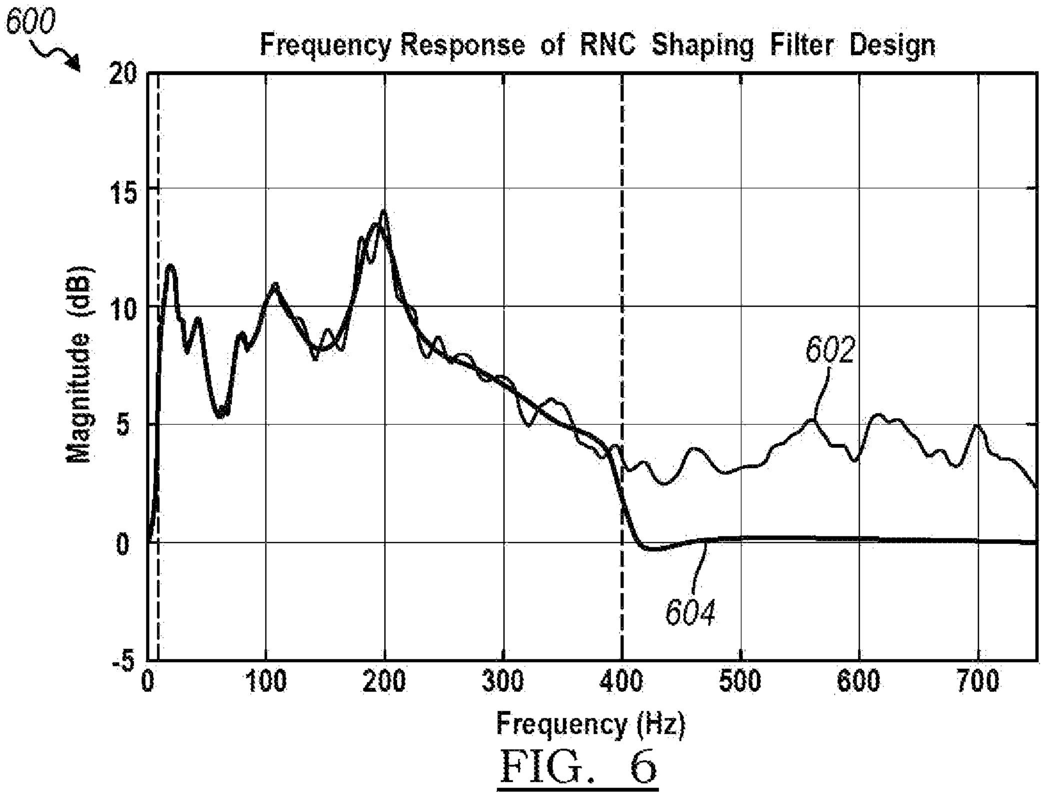
FIG. 6 is a graph illustrating a frequency response of the RNC shaping filter of FIG. 3, according to one or more embodiments.

At step 410, the RNC system 100 updates the RNC shaping filter parameters based on the results of Equation (4). FIG. 6 is a graph 600 illustrating a first curve 602 that represents the EMNR value calculated using Equation (3) and a second curve 604 that represents the RNC shaping filter based on the AIO technology and Equation (4). In the illustrated embodiment, the lower boundary of the intelligent RNC shaping filter is set to 10 Hz, and the upper boundary of the intelligent RNC shaping filter is set to 400 Hz. The intelligent RNC shaping filter is matched well to the EMNR value in the target frequency range between 10-400 Hz, as illustrated by the overlap between the first curve 602 and the second curve 604 within this frequency range in graph 600. In other embodiments, the RNC system matches the AIO created shaping filter to the EMNR over different frequency ranges. In other embodiments, the RNC system uses one of the aforementioned "smoothing techniques" in the FO block 348 to derive the RNC shaping filter from the EMNR value shown in 602.

Figure 7:
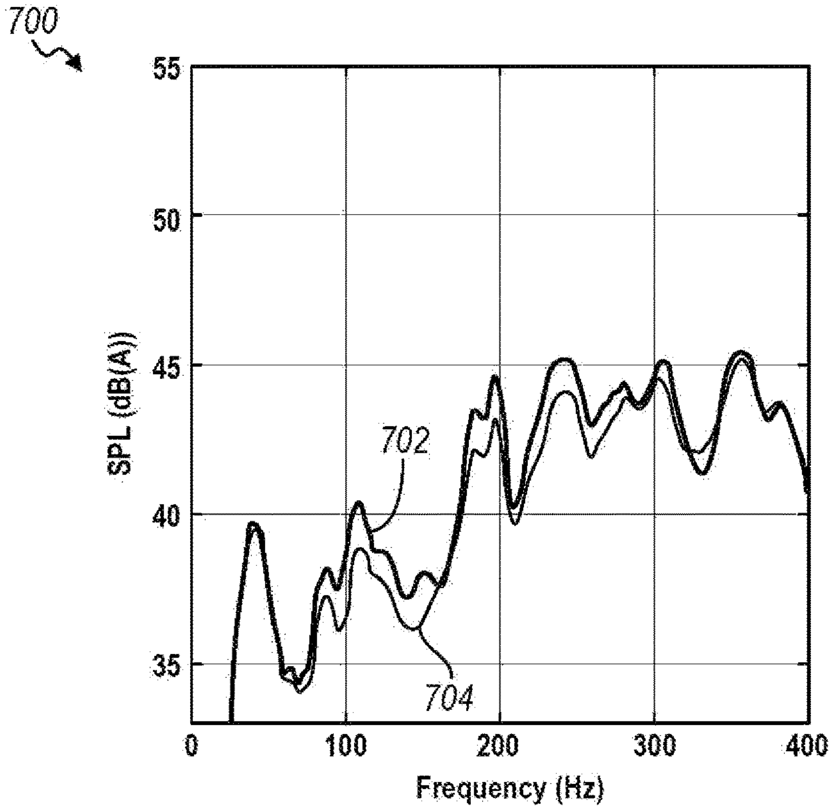
FIG. 7 is a graph illustrating the performance of the RNC shaping filter of FIG. 3 between 10 Hz to 400 Hz, according to one or more embodiments.

FIG. 7 is a graph 700 illustrating noise cancellation performance of the RNC system 300, with and without intelligent RNC shaping, as measured by a first microphone, e.g., the error microphone 108 in FIG. 1. The graph 700 includes a first curve 702 that represents the sound measured by the first microphone when the vehicle 102 is equipped with an existing RNC system with an existing RNC shaping strategy, e.g., a manual trial-and-error filter design strategy. The graph 700 also includes a second curve 704 that represents the sound measured by the first microphone when the vehicle 102 is equipped with the RNC system 300 using the intelligent RNC shaping method described with reference to FIG. 3 and FIG. 4. The second curve 704 is 1-2 dB less than the first curve 702 throughout the frequency range of approximately 10-400 Hz, which illustrates the superior broad band noise reduction performance of the RNC system 300 over existing RNC systems.

Figure 8:
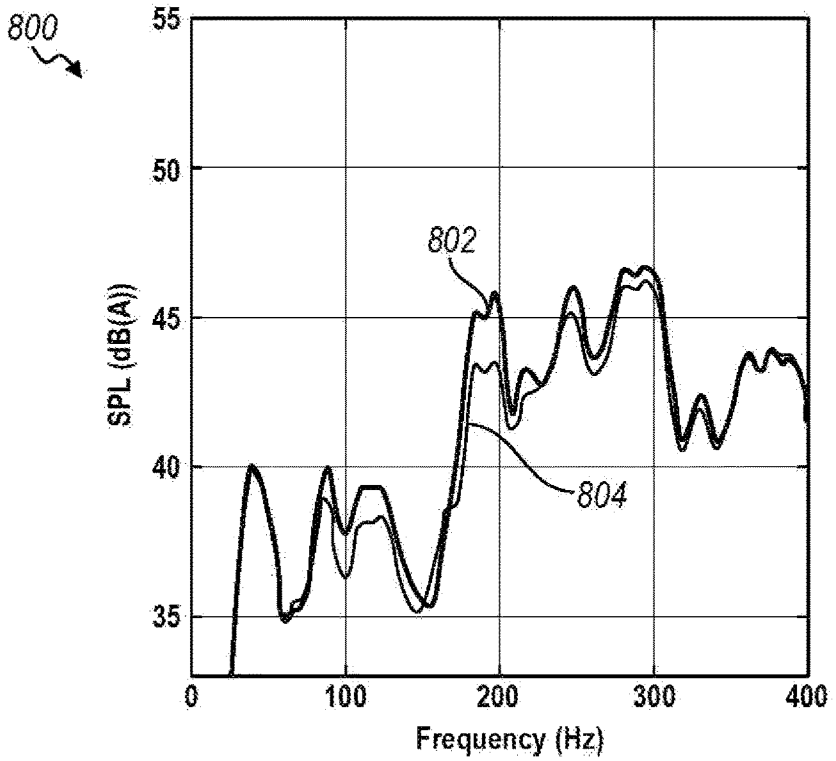
FIG. 8 is a graph illustrating noise cancellation performance of the RNC system of FIG. 3, with and without RNC shaping, at a first location within the vehicle.

FIG. 8 is a graph 800 illustrating noise cancellation performance of the RNC system 300 with and without intelligent RNC shaping, as measured by a second microphone that is located at a different vehicle location than the first microphone, e.g., the virtual microphone 112 in FIG. 1. The graph 800 includes a first curve 802 that represents the sound measured by the second microphone when the vehicle 102 is equipped with an existing RNC system with an existing RNC shaping strategy, e.g., a trial-and-error filter design strategy. The graph 800 also includes a second curve 804 that represents the sound measured by the second microphone when the vehicle 102 is equipped with the RNC system 300 using the intelligent RNC shaping method described with reference to FIG. 3 and FIG. 4. The second curve 804 is 1-2 dB less than the first curve 802 throughout the frequency range of approximately 10-400 Hz, which illustrates the superior broad band noise reduction performance of the RNC system 300 over existing RNC systems.

Figure 9:
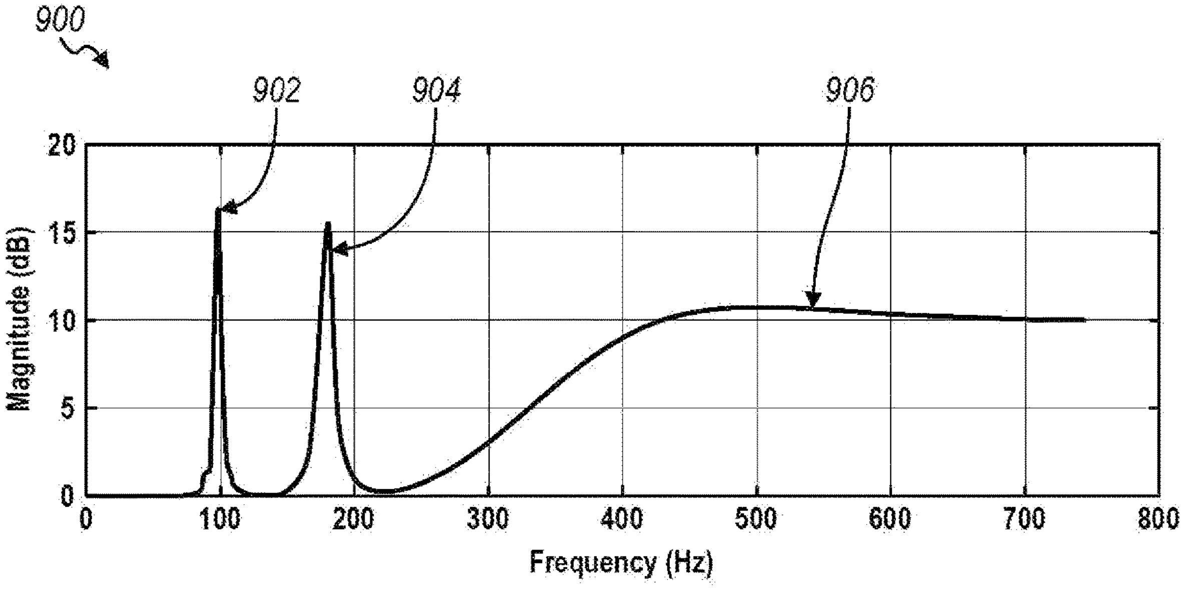
FIG. 9 is a graph illustrating an example of an RNC shaping filter based on the noise cancellation performance of FIG. 8.

In one or more embodiments, the RNC system 300 performs a simple RNC shaping method at FO block 348, and proceeds directly from step 404 to step 410, bypassing steps 406 and 408. In this embodiment, the RNC system 300 updates the RNC shaping filter parameters to create peak filters at the EMNR peak frequencies shown in graph 500 of FIG. 5. FIG. 9 is a graph 900 illustrating the frequency (magnitude) response of an RNC shaping filter that is based on the simple RNC shaping method. In this embodiment, the RNC shaping filter, e.g., the shaping filter 342 of FIG. 3, includes peak filters at 100 Hz and at 190 Hz as referenced by numerals 902 and 904, respectively, that are based on the measured EMNR peaks of 110 Hz, 180 Hz and 200 Hz (FIG. 5) and peak values present in the error microphone signal spectrum (FIG. 9). The RNC shaping filter also includes a shelf above 400 Hz, that is referenced by numeral 906. The shaping filter 342 shown in FIG. 9 may be created online, in real time as the vehicle is operated. The shaping filter 342 may also be updated based on the new input data from the accelerometer and microphone sensors. Alternately, the RNC system 300 may determine the shaping filter based on pre-determined data in which a large parameter space is explored, e.g., manually or using simulation software. Such an RNC filter is sensitive to high frequency gain, and if the amplitude of the shaping filter is too large, it leads to undesirable noise boosting (instead of noise cancellation) in the high frequency range. Manual design of the RNC shaping filter thus has drawbacks in terms of long tuning time and sub-optimal noise cancellation performance; and has the potential to create undesirable noise boosting.

Accordingly, the RNC system 300 may create a simpler filter based on the EMNR data, than by employing the AIO method. Equation (1) and Equation (3) illustrate how the frequencies of greatest noise cancellation potential can be identified, as they are frequencies with high values of either coherence or EMNR. In one or more embodiments, the FO block 348 may include one peak filter whose center frequency is a frequency where either the coherence or the EMNR has a peak. In one or more embodiments, the two peak filters have center frequencies that are similar to the three EMNR peak frequencies. In one or more embodiments, the FO block 348 includes a filter whose general trends follow those of the EMNR or coherence, i.e. the FO block 348 has a high value at the frequencies where the EMNR or coherence has a high value, and the FO block 348 has a lower value at the frequencies where the EMNR or coherence has a low value. Smoothing may be optionally employed to simplify the shaping filter 342.

In another embodiment of the simple RNC shaping method, a test engineer selects the peak filter frequencies based on the EMNR values, and saves this predetermined information in the RNC system 300. Such a manual approach saves a lot of time over the previous trial-and-error methods. For example, a trial-and-error method may take days, whereas the simple "peak detector" RNC shaping method approach takes hours, or minutes if performed by the RNC system 300. In an embodiment, the frequency dependent EMNR value is replaced by an alternate statistic to the coherence, such as the cross correlation, covariance, or cross covariance between the reference and error sensors. The alternate statistic is then used to derive the peak frequencies or RNC shaping filter shape.

In another embodiment, the RNC system 300 performs a complex RNC shaping method and again proceeds directly from step 404 to step 410. Here the RNC system 300 uses the entire frequency dependent shape of the EMNR value as the RNC shaping filter. This embodiment using this more complex filter results in even better noise cancellation performance, as compared to the simple approach, and provides a convenient and effective method to obtain the desired frequency shape for the RNC shaping filter. However, this approach, in which the RNC shaping filter is derived from directly using the EMNR shape, may be unnecessarily complex. This complexity may not be an issue if this filter is used in the frequency domain, as a finite impulse response (FIR) filter could be used. However, in some embodiments of RNC algorithms, this filter is required to be applied in the time domain, and so some filter simplification (or what we can casually refer to as smoothing) may be implemented.

By performing all of the steps 402-410 of the method 400, i.e., including steps 406 and 408, the RNC system 300 determines the RNC shaping filter parameters in a few seconds, or less. Whereas it may take a few hours for a system engineer to design a filter based on the manual inspection of the EMNR shape, and to create an IIR filter based shaping filter according to simple RNC shaping strategy of the method 400, as described with reference to FIG. 6. However, both of these methods provide benefits over existing trial-and-error methods.

The RNC shaping method 400 allows for "tuning" or prioritizing the amount noise cancellation in certain frequency ranges by amplifying the energy in the reference and error signals in certain frequency ranges that are input to the adaptive filter controller 128, 328. Accordingly, the adaptive filter controller 128, 328 adapts the W-filters 126, 326 differently, to preferentially cancel these newly amplified frequency ranges. As such, the RNC shaping filters provide better cancellation or less noise boosting in the frequency ranges where the shaping filters 340 432 have a higher value. Also disclosed are several methods to design the RNC shaping filter, one that is a continuously running algorithm that updates the filter in real time during vehicle operation to maximize noise cancellation, and a simpler one that may be carried out as an additional tuning step by trained engineers during development.

The RNC system 300 is a broadband noise cancellation system to reduce the audible and droning road-induced interior noise. The RNC shaping method 400 provides improved noise reduction in the authorized frequency ranges, as compared to existing RNC systems. As shown in FIG. 3, the RNC system 300 includes a shaping filter that filters all of the reference channels and all of the error microphone channels. The RNC system 300 and method 400 provide multiple benefits over existing systems, including: better noise cancellation; reduced noise boosting; provides an RNC shaping filter design guide; and reduces engineering tuning time.

The method 400 can be practiced, online, continuously during operation of the vehicle, rather than being performed once, at the time the vehicle is tuned before production. This can further improve the noise cancellation performance of the vehicle, because each pavement has its own individual frequency dependent spectrum, and so each pavement may have its own individual frequency dependent EMNR shape. And so the maximum noise cancellation on each pavement may be achieved only with its own intelligent RNC shaping filter.

Though it has been shown in simulation that an intelligent RNC shaping filter does improve noise cancellation on all pavements, it may only be needed to compute the coherence and EMNR once every five minutes. In systems with severe processing limitations, this coherence and EMNR could be computed once the vehicle is in operation, but before the RNC system is activated. Alternately, the EMNR could be computed in the cloud, etc.

Although the ANC system is described with reference to a vehicle, the techniques described herein are applicable to non-vehicle applications. For example, a room may have fixed seats which define a listening position at which to quiet a disturbing sound using reference sensors, error sensors, loudspeakers and an LMS adaptive system. Note that the disturbance noise to be cancelled is likely of a different type, such as HVAC noise, or noise from adjacent rooms or spaces. Further, a room may have occupants whose position varies with time, and the seat sensors or head tracking techniques must then be relied upon to determine the position of the listener or listeners so that the 3-dimensional location of the virtual microphones can be selected.

Although FIGS. 1-3 show LMS-based adaptive filter controllers 128 and 328, other embodiments contemplate alternative and/or additional methods and devices to adapt or create optimal controllable filters 126 and 326. For example, in one or more embodiments, neural networks may be employed to create and optimize W-filters in place of the LMS adaptive filter controllers. In other embodiments, machine learning or artificial intelligence may be used to create optimal W-filters in place of the LMS adaptive filter controllers.

Any one or more of the controllers or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof For example, the steps recited in any method or process claims may be executed in any order and are not limited to the specific order presented in the claims. Equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Further, functionally equivalent processing steps can be undertaken in either the time or frequency domain. Accordingly, though not explicitly stated for each signal processing block in the figures, the signal processing may occur in either the time domain, the frequency domain, or a combination thereof. For example, FFT's or IFFT's can be added or omitted without departing from the scope of this disclosure. Moreover, though various processing steps are explained in the typical terms of digital signal processing, equivalent steps may be performed using analog signal processing without departing from the scope of the present disclosure Benefits, advantages and solutions to problems have been described above with regard to particular embodiments. However, any benefit, advantage, solution to problems or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments.

What is claimed is:

1. A road noise cancellation (RNC) system comprising:

at least one loudspeaker to project anti-noise sound within a passenger cabin of a vehicle in response to an anti-noise signal; and a controller programmed to:

determine a noise signal indicative of road induced noise using an output signal measured by a force gauge;

determine a coherence value between the noise signal and an error signal indicative of noise and the anti-noise sound within the passenger cabin;

estimate a noise reduction value based on the coherence value;

filter the noise signal and the error signal based on the estimated noise reduction value; and generate the anti-noise signal based on the filtered noise signal and the filtered error signal.

2. The RNC system of claim 1, wherein the controller is further programmed to:

determine shaping filter parameters based on the estimated noise reduction value using a non-linear least square solver; and filter the noise signal and the error signal using the shaping filter parameters, wherein the noise reduction value is frequency-dependent.

3. The RNC system of claim 2, wherein the controller is further programmed to:

initialize an objective function with a target value based on the estimated noise reduction value; and determine the shaping filter parameters based on the objective function using the non-linear least square solver.

4. The RNC system of claim 1, wherein the controller is further programmed to:

smooth the filtered noise signal and the filtered error signal using artificial intelligence; and generate the anti-noise signal based on the smoothed and filtered noise signal and the smoothed and filtered error signal.

5. The RNC system of claim 1, wherein the controller is further programmed to:

select at least one peak filter based on the estimated noise reduction value; and filter the noise signal and the error signal using the at least one peak filter.

6. The RNC system of claim 1, wherein the controller is further programmed to filter the noise signal and the error signal based on the estimated noise reduction value over a frequency range.

7. The RNC system of claim 1 further comprising at least one microphone for measuring the noise and the anti-noise sound within the passenger cabin and providing the error signal.

8. The RNC system of claim 1 further comprising a vibration sensor for providing the noise signal indicative of the road induced noise within the passenger cabin.

9. The RNC system of claim 1, wherein the controller further comprises:

an adaptive filter controller to determine the coherence value and to estimate the noise reduction value; and a controllable filter to generate the anti-noise signal.

10. A method for automatically adjusting a road noise cancellation (RNC) shaping filter comprising:

projecting anti-noise sound within a passenger cabin of a vehicle in response to an anti-noise signal;

receiving a noise signal indicative of road induced noise within the passenger cabin, wherein the noise signal is determined using vibration data measured via a vibration sensor including a linear variable differential transformer;

receiving an error signal indicative of noise and the anti-noise sound within the passenger cabin;

determining a coherence value between the noise signal and the error signal;

estimating a noise reduction value based on the coherence value;

filtering the noise signal and the error signal based on the estimated noise reduction value; and generating the anti-noise signal based on the filtered noise signal and the filtered error signal.

11. The method of claim 10 further comprising:

initializing an objective function with a target value based on the estimated noise reduction value;

determining shaping filter parameters based on the objective function using a non-linear least square solver; and filtering the noise signal and the error signal using the shaping filter parameters.

12. The method of claim 10 further comprising:

smoothing the filtered noise signal and the filtered error signal using artificial intelligence; and generating the anti-noise signal based on the smoothed and filtered noise signal and the smoothed and filtered error signal.

13. The method of claim 10 further comprising:

selecting at least one peak filter based on the estimated noise reduction value; and filtering the noise signal and the error signal using the at least one peak filter.

14. A road noise cancellation (RNC) system comprising:

at least one loudspeaker to project anti-noise sound within a passenger cabin of a vehicle in response to an anti-noise signal;

at least one microphone to provide an error signal indicative of the noise and the anti-noise sound within the passenger cabin; and a controller programmed to:

determine a noise signal indicative of road induced noise using an output signal measured via a load cell;

determine a coherence value between the noise signal and an error signal indicative of noise and the anti-noise sound within the passenger cabin;

estimate a noise reduction value based on the coherence value;

filter at least one of the noise signal and the error signal based on the estimated noise reduction value; and generate the anti-noise signal based on the at least one of the filtered noise signal and the filtered error signal.

15. The RNC system of claim 14, wherein the controller is further programmed to:

determine shaping filter parameters based on the estimated noise reduction value using a non-linear least square solver; and filter at least one of the noise signal and the error signal using the shaping filter parameters.

16. The RNC system of claim 14, wherein the controller is further programmed to:

smooth the at least one of the filtered noise signal and the filtered error signal using artificial intelligence; and generate the anti-noise signal based on the at least one of the smoothed and filtered noise signal and the smoothed and filtered error signal.

17. The RNC system of claim 14, wherein the controller is further programmed to:

select at least one peak filter based on the estimated noise reduction value; and filter the noise signal and the error signal using the at least one peak filter.

18. The RNC system of claim 14, wherein the controller is further programmed to filter the noise signal and the error signal based on the estimated noise reduction value over a frequency range.

19. The RNC system of claim 14 further comprising a vibration sensor to provide the noise signal indicative of the road induced noise within the passenger cabin.

20. The RNC system of claim 14, wherein the controller further comprises:

an adaptive filter controller to determine the coherence value and to estimate the noise reduction value; and a controllable filter to generate the anti-noise signal.

* * * * *